US007000486B2

(12) United States Patent
Wagner et al.

(10) Patent No.: US 7,000,486 B2
(45) Date of Patent: Feb. 21, 2006

(54) METHOD FOR CONTROLLING AN INTERMITTENTLY OPERATING SCREW TOOL

(75) Inventors: Paul-Heinz Wagner, Haus-Nummer 70, L53804, Much-Birrenbachshoehe (DE); Ulf Sittig, Nuembrecht (DE)

(73) Assignee: Paul-Heinz Wagner, (DE)

( * ) Notice: Subject to any disclaimer, the term of this patent is extended or adjusted under 35 U.S.C. 154(b) by 0 days.

(21) Appl. No.: 10/485,473

(22) PCT Filed: Jul. 27, 2002

(86) PCT No.: PCT/EP02/08386

§ 371 (c)(1),
(2), (4) Date: Feb. 2, 2004

(87) PCT Pub. No.: WO03/013797

PCT Pub. Date: Feb. 20, 2003

(65) Prior Publication Data

US 2004/0177704 A1 Sep. 16, 2004

(30) Foreign Application Priority Data

Aug. 2, 2001 (DE) ................................ 101 37 896

(51) Int. Cl.
*B25B 23/14* (2006.01)
*G01L 5/24* (2006.01)

(52) U.S. Cl. .................................................. 73/862.21

(58) Field of Classification Search ............ 73/862.23, 73/862.21, 761; 173/181, 178; 29/407.02; 408/3; 81/467
See application file for complete search history.

(56) References Cited

U.S. PATENT DOCUMENTS

| | | | | |
|---|---|---|---|---|
| 5,589,644 | A * | 12/1996 | Becker et al. | 73/862.23 |
| 5,631,823 | A * | 5/1997 | Layer et al. | 700/50 |
| 5,862,724 | A * | 1/1999 | Arata et al. | 81/434 |
| 5,868,208 | A * | 2/1999 | Peisert et al. | 173/178 |
| 6,070,506 | A * | 6/2000 | Becker | 81/479 |
| 6,167,606 | B1 * | 1/2001 | Mueller et al. | 29/407.02 |
| 6,167,788 | B1 * | 1/2001 | Schonberger et al. | 81/467 |

* cited by examiner

*Primary Examiner*—Max Noori
*Assistant Examiner*—Octavia Davis
(74) *Attorney, Agent, or Firm*—Diller, Ramik & Wight

(57) ABSTRACT

In the method for controlling an intermittent screw process first a torque mode (DMM) is applied in which the torque is continuously measured. Upon attainment of a pre-torque ($M_F$) a rotation angle mode (DWM) is carried out in which the rotation angle is measured. Proceeding from the rotation angle $\alpha$=0 (corresponding to the pre-torque ($M_F$)) the rotation angle ($\alpha$) is counted up during each stroke. In this connection that torque ($M_{HE}$) is stored which has been reached at the end of the stroke. During the next stroke the angle ($\alpha$) is continued to be counted only when the torque ($M_{HE}$) at the stroke end of the previous stroke has been reached again. Upon attainment of a target angle ($\alpha_z$) the screw process is terminated.

17 Claims, 2 Drawing Sheets

METHOD FOR CONTROLLING AN INTERMITTENTLY OPERATING SCREW TOOL

This application is a 371 of PCT/EP02/08386.

The invention relates to a method for controlling a screw tool which carries out intermittently rotating strokes and comprises a torque sensor and a rotation angle sensor.

BACKGROUND OF THE INVENTION

It is common practice to use hydraulic power wrenches for tightening screws, said power wrenches comprising a piston-cylinder unit which reciprocatingly drives a ratchet lever. The ratchet lever drives a ring element which is coupled via a socket wrench with the screw to be turned. The rotating strokes of the ratchet lever in one direction effect tightening of the screw, while the return stroke of the ratchet lever is an idle stroke.

In the case of screws which are tightened by means of power wrenches an exact determined bias-tension must be obtained to ensure that the screw on the one hand tensions the associated bolt in a defined manner, and on the other hand does not over-tension the bolt. For attaining a defined tension it does not suffice to measure the hydraulic pressure of a hydraulic power wrench and to stop the screw process when the hydraulic pressure has reached a limit value. When screws are tightened, unexpected obstacles may be encountered, e.g. the screw may get stuck or canted due to defects of the thread or rust. The screw resistance is a suitable measure for realizing defined screw conditions.

SUMMARY OF THE INVENTION

It is an object of the invention to provide a method for controlling a screw tool by means of which a high degree of accuracy and reproducibility of the screw process is attained such that screw processes carried out by applying this method offer the assurance that the screw is properly tightened.

According to the invention, this object is achieved with the features of claim 1. Thus the screw connection is obtained by the following steps:

carrying-out of rotating strokes while measuring the torque in a torque mode, upon attainment of a predetermined pre-torque: carrying-out a rotation angle mode by counting up the rotation angle up to the end of the current stroke and storing the rotation angle and torque values attained at the end of the stroke, during each subsequent stroke: continuing the counting-up of the rotation angle when the torque has reached a value corresponding to the torque at the end of the previous stroke and storing the rotation angle and torque values attained at the end of the stroke, terminating the screw process when the counted-up rotation angle has reached a target angle.

In the method according to the invention, first a torque mode is carried out in which the screw is tightened until a pre-torque is attained. The predetermined pre-torque is calculated such that the parts to be connected are afforded a certain degree of hold such that, upon attainment of the pre-torque, the screw connection is already basically secured. When the pre-torque is attained, the rotation angle mode is carried out in which a predetermined rotation angle, the so-called target angle, is covered. Covering of the rotation angle is effected by counting up increments of the rotation angle, which are supplied by a rotation angle sensor.

Attainment of the target angle requires several strokes of the screw tool. During each stroke the torque and the rotation angle are increased, and during the subsequent return stroke the torque returns to zero. During the subsequent stroke the torque rapidly increases. According to the invention, counting of the rotation angle is continued only when during a subsequent stroke the same torque has been reached at which the previous stroke had terminated. This torque attained at the end of a stroke as well as the rotation angle accumulated up to this point of time are stored in a memory.

The method according to the invention allows a reliable control of the screw process. It is assumed that in the rotation angle mode the pre-torque is reproducible and can be determined with a high accuracy. When the pre-torque is attained, the rotation angle mode is carried out in which the angle is measured until the target angle is reached. The screw process is thus terminated only in dependence on the rotation angle which has been covered after attainment of the pre-torque.

According to a preferred aspect of the invention, the rotation angle mode is started only when the pre-torque is reached during the movement. If the pre-torque is, for example, reached at the end of a stroke when the rotation has completely or almost stopped, there are no defined friction conditions at the screw connection. There may also be the case that due to a temporary jamming or blocking the torque increases beyond the pre-torque value such that at the beginning of the torque mode a random state would be assumed. To prevent this, attainment of the pre-torque is assumed only when the screw process is carried out in a linear portion and at a certain distance to the end of the stroke.

In a preferred variant of the method according to the invention, attainment of the pre-torque is not utilized and utilization is shifted to the next stroke when, after attainment of the pre-torque during a stroke, the counted-up value remains below a predetermined limit value. This condition corresponds to that case in which the pre-torque is attained at the end of a stroke. In this case the torque mode is maintained and a new stroke in the torque mode is carried out after the next return stroke, in which the pre-torque is reached again. This second attainment of the pre-torque is evaluated to form the zero point of the angle counting.

The method according to the invention further allows the differential quotient of the interdependence of torque and rotation angle to be determined and evaluated.

In a special embodiment of the method, this differential quotient is determined and stored prior to attainment of the pre-torque. On the basis of the respective measured torque and the stored differential quotient it is predetermined whether the pre-torque will be attained at the end of the stroke. The torque indicates the actual state, and the differential quotient allows an extrapolation such that it is possible to predetermine whether the pre-torque will be attained at the end of the stroke. If this is the case, the stroke is already stopped before the end of the stroke such that attainment of the pre-torque is shifted to the next stroke.

The differential quotient of the interdependence of torque and rotation angle can also be utilized for controlling the rotation angle mode, wherein the screw process is discarded when during counting-up of the rotation angel an out-of-tolerance deviation from the stored value is determined. In this manner, anomalies can be detected, e.g. blocking of a screw or an excessive screw resistance. Such a state occurs when the screw tool is applied to a screw which has already been tightened. Further, screws, which are too easy to turn after attainment of the pre-torque, can be detected and singled out.

In an angle range before attainment of the target angle it is appropriate to define a narrower special tolerance range. This ensures that the target angle is approached only with a differential quotient which lies near the stored predetermined differential quotient. This prevents the target angle from being reached all too sudden. If the differential quotient lies outside the special tolerance range, the screw process is discarded.

According to the invention it is also possible to measure the duration of the individual strokes and to disallow the screw process when the duration is too long. Thus screw connections which show irregularities are rejected.

Hereunder an embodiment of the invention is explained in detail with reference to the drawings in which:

DETAILED DESCRIPTION OF THE PREFERRED EMBODIMENTS

Figure 2:
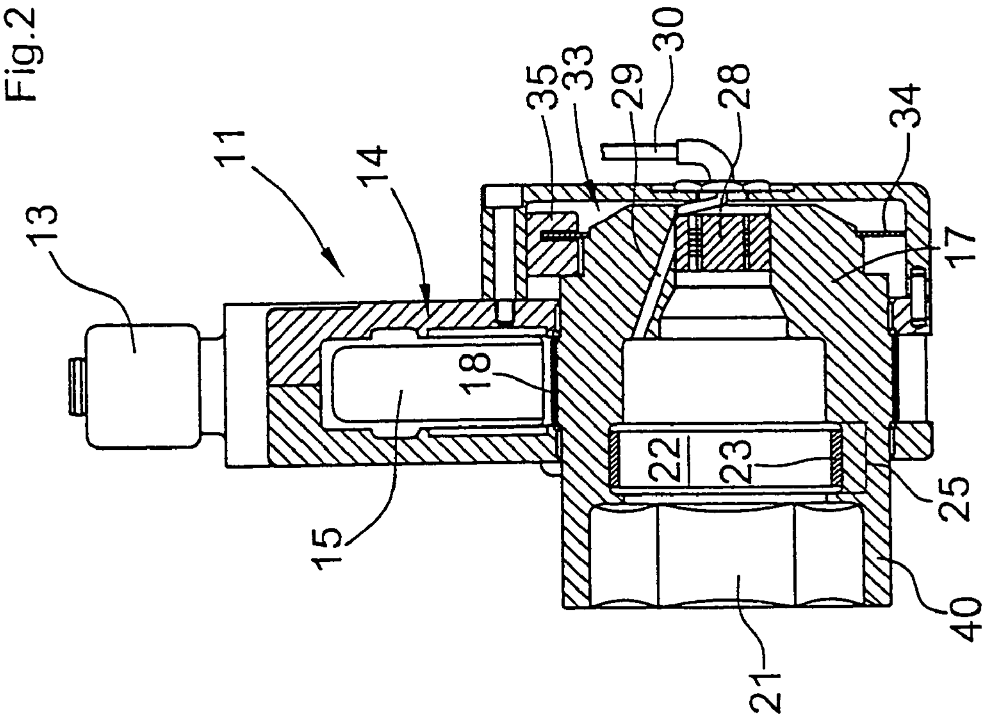
FIG. 2 shows a schematic sectional view along line II—II of FIG. 1.
Figure 1:
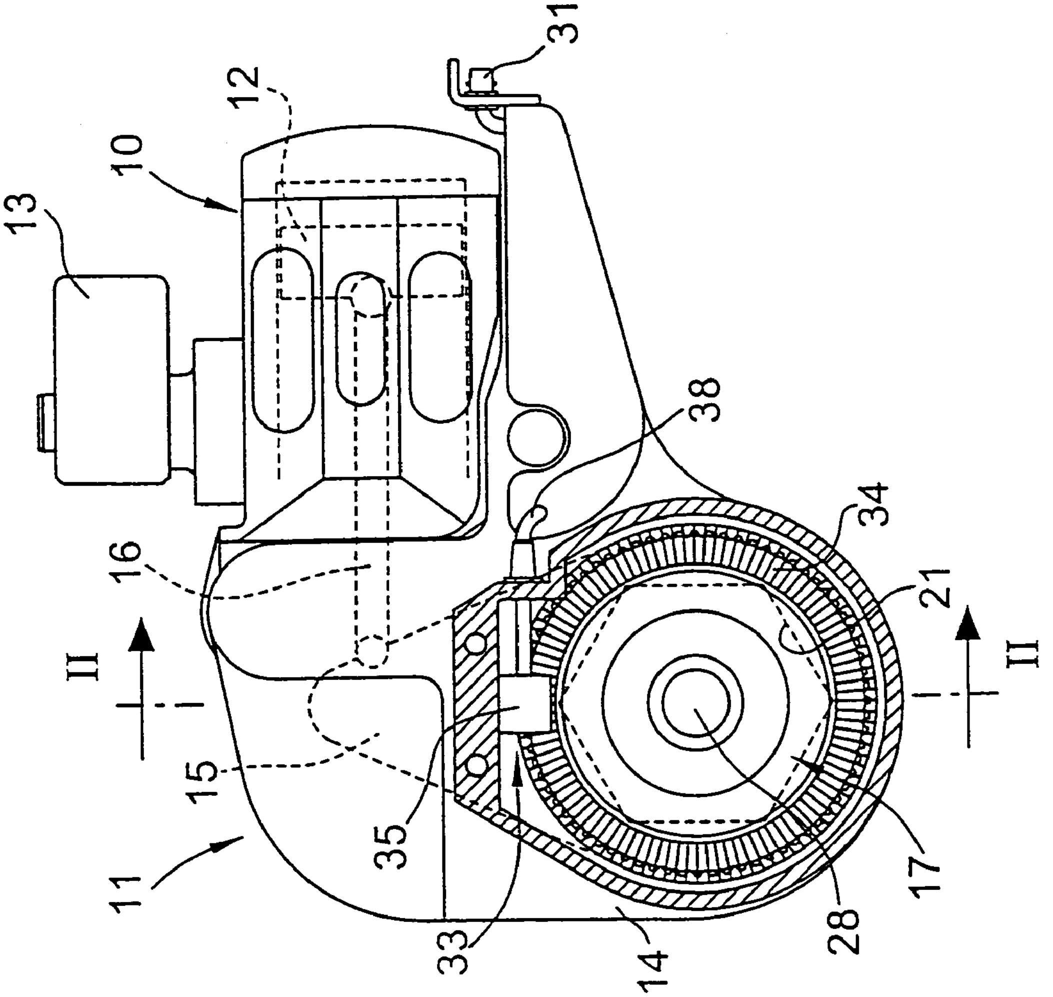
FIG. 1 shows a schematic representation of a hydraulic power wrench comprising a torque sensor and a rotation angle sensor.

FIGS. 1 and 2 show a hydraulic power wrench. The power wrench comprises a drive portion 10 and a functional portion 11. The drive portion comprises a hydraulic cylinder in which a piston 12 is movably guided. The piston 12 is hydraulically driven in the forward direction (to the left in FIG. 1) and the return direction (to the right). A pivotable connecting device 13 comprises a hydraulic pressure connection and a hydraulic return connection.

The functional portion 11 comprises a housing 14 in which a ratchet lever 15 moves. The ratchet lever 15 is connected via a piston rod 16 with the piston 12. In a transverse bore of the housing 14 a shaft 17 is rotatably supported. The shaft 17 comprises a circumferential toothing 18 inside the housing 14, said toothing 18 meshing with a toothing (not shown) of the ratchet lever 15. During each stroke of the piston 12 the shaft 17 is rotated by a certain angular amount about ist axis. Thereafter, the return stroke of the ratchet lever 15 is carried out during which the shaft 17 is not carried along.

The shaft 17 comprises at one end a carrier device in the form of an insertion recess 21 with a hexagonal cross-section. In a cavity 22 of the shaft 17 a torsion sensor 23 in the form of strain gauges is located which are glued to the circumferential wall. The portion of the shaft 17 carrying the torsion sensor 23 forms the measuring section 25.

At the rear end of the shaft 17 a data transmission element 28 is provided. From the torsion sensor 23 a cable duct 29 extends to the data transmission element 28. The data transmission element 28 is e.g. a slip collector ring assembly connecting an external cable 30 with the torsion sensor 23 which is attached to rotate with the shaft 17. Alternatively, a wireless transmission is possible. The cable 30 extends to a cable connection 31 (FIG. 1) which is provided at the housing 14 and to which a controller can be connected.

The hydraulic power wrench is further equipped with a rotation angle measuring device 33. This measuring device 33 comprises a digital code disk 34 fastened to the shaft 17 and an angle sensor 35 responding to the bars of the code disk 34 thus generating rotation angle pulses. The angle sensor 35 is configured as a forked light barrier into which extends the code disk radially projecting from the shaft 17. From the angle sensor 25 a cable 38 extends to the cable connection 31 such that both the torsion sensor 23 and the angle sensor 35 are electrically accessible at the cable connection 31.

The signals of the torque sensor 23 and the rotation angle sensor 33 are supplied to a controller (not shown) which, in turn, controls a valve which is capable of interrupting the pressure feed in the tube connections 13. Further, the operation of the power wrench is controlled such that the two hydraulic connections of the power wrench are alternately connected with a pressure line and a return line, wherein the change-over is effected either mechanically by actuating a change-over valve when the piston 12 has hit the respective stop and no further movement is carried out, or by automatic change-over.

Figure 3:
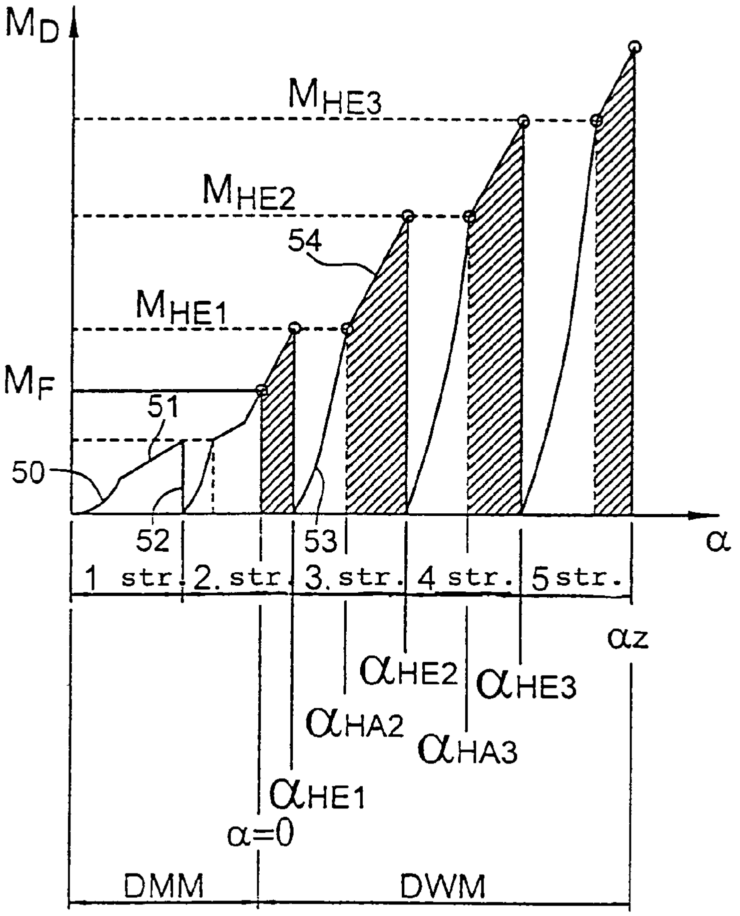
FIG. 3 shows a schematic representation of the torque over the rotation angle during a screw process.

FIG. 3 shows, for a certain screw case, the interdependence of the torque $M_D$ and the angle of rotation $\alpha$. During the first stroke of the power wrench, at first a non-linear increase 50 of the torque relative to the rotation angle $\alpha$ occurs, and when the screw connection grips, a linear increase 51 occurs during which the screw bolt is expanded. During the return stroke of the power wrench the torque $M_D$ decreases to zero in the portion 52, whereupon the second stroke follows.

Up to attainment of a predetermined pre-torque $M_F$ the screw process is carried out in the torque mode $D_M$, i.e. while measuring the torque. When the torque has reached the value of the pre-torque $M_F$, the rotation angle mode DWM is carried out. At the time when the pre-torque is reached, the rotation angle $\alpha=0$ is defined such that the subsequent counting-up of the rotation angle is related to that respective rotation angle at which the pre-torque $M_F$ has been reached.

The pre-torque $M_F$ is passed through during the movement, i.e. the mode changes from DMM to DWM without the stroke being interrupted. At the end of the respective stroke the torque reaches the value $M_{HE1}$ which refers to the stroke end 1 after attainment of the pre-torque. During the next return stroke the torque returns to 0, and during the third stroke first a non-linear increase 53 occurs up to attainment of the torque $M_{HE1}$, and then follows a linear portion 54 in which the screw is further tightened. At the end of each stroke the torque value reached at the stroke end $M_{HE1}$, $M_{HE2}$ and $M_{HE3}$ as well as the associated rotation angle $\alpha_{HE1}$, $\alpha_{HE2}$, $\alpha_{HE3}$ are stored. When during the following stroke, the torque reaches the same value as the torque end of the previous stroke, continuation of the counting-up of the angle of rotation $\alpha$ begins. The angle $\alpha_{HE1}$, which has been stored at the end of the second stroke, forms the initial angle $\alpha_{HA2}$ at which counting is continued in the linear portion 54 during the third stroke. At the end of the third stroke the final value $\alpha_{HE2}$ is stored, and at the fourth stroke counting of the angle is continued with the value $\alpha_{HA3}$ which is identical with $\alpha_{HE2}$.

The screw process is terminated when a target angle $\alpha_Z$ has been reached which is e.g. defined as 90° (after attainment of the pre-torque $M_F$). Then the power wrench is switched off. The screw is now tightened in a defined manner, wherein the desired tension of the screw bolt has been attained.

For detection of the rotation angle there exists the condition that counting-up of the rotation angle is carried out only when the simultaneously measured torque has at least the same value as the pre-torque $M_F$. This ensures that the rotation angle is generally detected only as from the pre-torque.

Another condition is that counting-up of the rotation angle is effected only when during the previous stroke the rotation angle has been counted up and the associated torque has been detected. Addition to the already stored rotation angle is carried out only when a torque stored at the end of the last stroke minus a tolerance range of e.g. 5% has been reached. However counting is continued only when the final torque of the last stroke has been reached. This ensures that addition of the rotation angle is effected only when the nut is turned and not during standstill.

This applies mutatis mutandis to the attainment of the pre-torque MF. Attainment of the pre-torque should be detected only when the linear portion of the tightening line is passed through, namely in the central portion between the end points. If the pre-torque is reached at the upper end of the linear portion, attainment of the pre-torque is determined anew. The transition from the torque mode DMM to the rotation angle mode DWM must take place during rotation, i.e. not at the end of a stroke. This is necessary in order to definedly determine the zero point $\alpha=0$ with adequate reproducibility. If, upon attainment of the pre-torque, only a small angle range is passed through which lies below a limit value of e.g. 2°, detection of the pre-torque is discarded and shifted to the next stroke. Such a mode of operation is possible both in the case of manual control of the power wrench and in the case of automatic control.

In the case of automatic control the following criterion is additionally or alternatively applicable:

Even before attainment of the pre-torque the differential quotient of the interdependence of torque and rotation angle is determined, i.e. the gradient of the straight line. On the basis of the respective measured torque and the differential quotient it is predetermined whether the pre-torque will be reached at the end of the stroke. If it is determined that the pre-torque will be reached at the end of the stroke, the stroke is prematurely terminated by the automatic unit and a new stroke is commenced during which the pre-torque is reached in the linear portion.

Figure 4:
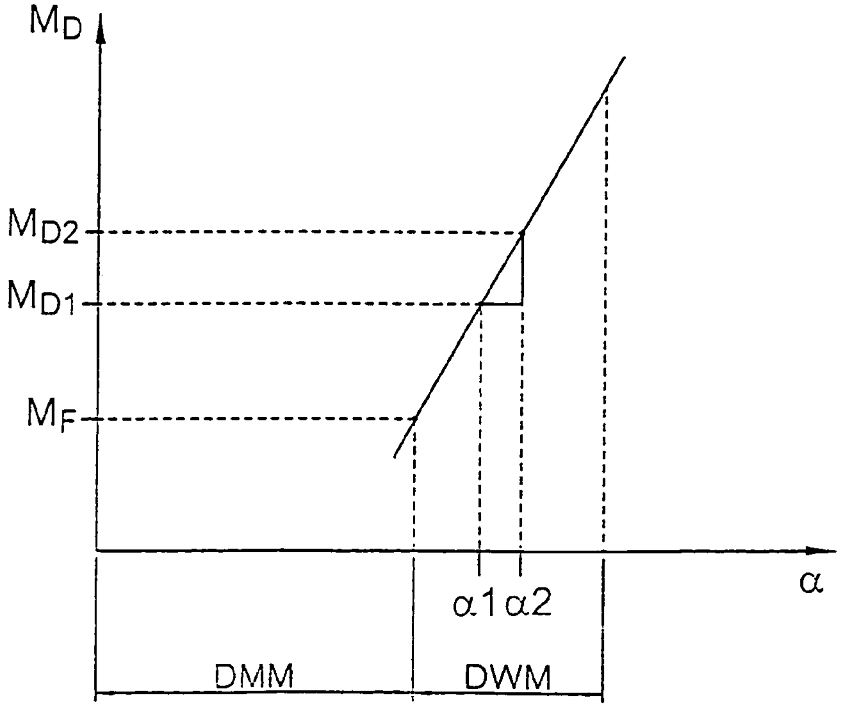
FIG. 4 shows a representation of the determination of the differential quotient of the linear branch of a stroke.

FIG. 4 shows the determination of the differential quotient Q in the linear portion of the curve $M_D$ over $\alpha$. The differential quotient, i. e. the gradient, is calculated as follows:

$$Q=\frac{M_{D2}-M_{D1}}{\alpha_2-\alpha_1}$$

Here, $M_{D1}$ is the torque measured at a certain angle of rotation $\alpha_1$ after attainment of the pre-torque, and the torque $M_{D2}$ is that torque which is measured at a larger rotation angle $\alpha_2$.

The differential quotient Q can also be used for other checks, e.g. for checking whether a screw has already been tightened. In this case the power wrench operates at a very high torque without the screw being turned any further. Consequently, the differential quotient lies outside a tolerance range. The screw process is then aborted.

The differential quotient can also be evaluated immediately before attainment of the target value. For this purpose, a special tolerance range for the differential quotient is defined, and the target value is considered as reached only when the differential quotient has been detected before in the special tolerance range. In this manner, the target value is prevented from being reached all too sudden.

Another possibility is the measurement of the duration of the individual strokes, wherein the screw process is discarded when the duration is too long. It is, for example, possible to measure, for a certain screw case, several durations of the individual strokes during several screw processes and then to define a mean stroke duration which is stored. In the same manner, for the differential quotient Q a typical value can be averaged from numerous previously measured values or determined in a different way.

Although a preferred embodiment of the invention has been specifically illustrated and described herein, it is to be understood that minor variations may be made in the apparatus without departing from the spirit and scope of the invention, as defined by the appended claims.

What is claimed is:

1. A method of automatically controlling a screw tool which carries out intermittent rotating strokes and includes a torque sensor (23) and a rotation angle sensor (33) comprising the steps of:

carrying-out intermittent reciprocal strokes to rotate a screw tool while measuring the torque ($M_D$) in a torque mode (DMM), upon attaining a predetermined pre-torque ($M_F$) transitioning to a rotation angle mode (DWM) and thereby count-up the rotation angle ($\alpha$) up to the end of the current stroke, and storing the rotation angle ($\alpha_{HE1}$) and torque ($M_{HE1}$) values attained at the end of the current stroke, performing subsequent intermittent reciprocal strokes and during each continuing counting-up the rotation angle ($\alpha$) when the torque ($M_D$) has reached a value corresponding to the torque ($M_{HE}$) at the end of the previous intermittent reciprocal stroke, and storing the rotation angle ($\alpha_{HE}$) and torque ($M_{HE}$) values attained at the end of each subsequent reciprocal intermittent stroke, and terminating the screw process when the counted-up rotation angle has reached a target angle ($\alpha_Z$).

2. The method of automatically controlling a screw tool as defined in claim 1 wherein the rotation angle mode (DWM) is started only when the pre-torque ($M_F$) is obtained.

3. The method of automatically controlling a screw tool as defined in claim 1 wherein after attainment of the pre-torque ($M_F$) during a stroke the counted-up value remains below a predetermined limit value, the attained pre-torque ($M_F$) is not utilized and the utilization of the pre-torque ($M_F$) is shifted to the next stroke.

4. The method of automatically controlling a screw tool as defined in claim 1 wherein before attaining the pre-torque ($M_F$) the differential quotient (Q) of the interdependence of torque ($M_D$) and rotation angle ($\alpha$) is determined and stored, and on the basis of the respective measured torque and the differential quotient (Q) a determination is made whether the pre-torque ($M_F$) will be reached at the end of the stroke.

5. The method of automatically controlling a screw tool as defined in claim 1 wherein the differential quotient (Q) of the interdependence of torque ($M_D$) and the rotation angle ($\alpha$) is determined and stored, and the screw process is discarded when during counting-up of the rotation angle ($\alpha$) an out-of-tolerance deviation of the differential quotient (Q) from the stored value is detected.

6. The method of automatically controlling a screw tool as defined in claim 5 wherein a narrower special tolerance range is defined in an angle range before attaining the target angle ($\alpha_Z$) with the screw process being discarded when the special tolerance range is exceeded.

7. The method of automatically controlling a screw tool as defined in claim 1 including the step of measuring the individual strokes and discarding the screw process when the duration is too long.

8. The method of automatically controlling a screw tool as defined in claim 2 wherein after the attainment of the pre-torque ($M_F$) during a stroke, the counted-up value remains below a predetermined limit value, the attainment of the pre-torque ($M_F$) is not utilized and the utilization is shifted to the next stroke.

9. The method of automatically controlling a screw tool as defined in claim 2 wherein prior to the attainment of the pre-torque ($M_F$), the differential quotient (Q) of the interdependence of torque ($M_D$) and rotation angle ($\alpha$) is determined and stored, and on the basis of the respective measured torque and the differential quotient (Q) it is predetermined whether the pre-torque ($M_F$) will be reached at the end of the stroke.

10. The method of automatically controlling a screw tool as defined in claim 3 wherein prior to the attainment of the pre-torque ($M_F$), the differential quotient (Q) of the interdependence of torque ($M_D$) and rotation angle ($\alpha$) is determined and stored, and on the basis of the respective measured torque and the differential quotient (Q) it is predetermined whether the pre-torque ($M_F$) will be reached at the end of the stroke.

11. The method of automatically controlling a screw tool as defined in claim 2 wherein the differential quotient (Q) of the interdependence of torque ($M_D$) and the rotation angle ($\alpha$) is determined and stored, and the screw process is discarded when during counting-up of the rotation angle ($\alpha$) an out-of-tolerance deviation of the differential quotient (Q) from the stored value is detected.

12. The method of automatically controlling a screw tool as defined in claim 3 wherein the differential quotient (Q) of the interdependence of torque ($M_D$) and the rotation angle ($\alpha$) is determined and stored, and the screw process is discarded when during counting-up of the rotation angle ($\alpha$) an out-of-tolerance deviation of the differential quotient (Q) from the stored value is detected.

13. The method of automatically controlling a screw tool as defined in claim 4 wherein the differential quotient (Q) of the interdependence of torque ($M_D$) and the rotation angle ($\alpha$) is determined and stored, and the screw process is discarded when during counting-up of the rotation angle ($\alpha$) an out-of-tolerance deviation of the differential quotient (Q) from the stored value is detected.

14. The method of automatically controlling a screw tool as defined in claim 2 including the step of measuring the individual strokes and discarding the screw process when the duration is too long.

15. The method of automatically controlling a screw tool as defined in claim 3 including the step of measuring the individual strokes and discarding the screw process when the duration is too long.

16. The method of automatically controlling a screw tool as defined in claim 4 including the step of measuring the individual strokes and discarding the screw process when the duration is too long.

17. The method of automatically controlling a screw tool as defined in claim 5 including the step of measuring the individual strokes and discarding the screw process when the duration is too long.

* * * * *